United States Patent Office 3,514,430
Patented May 26, 1970

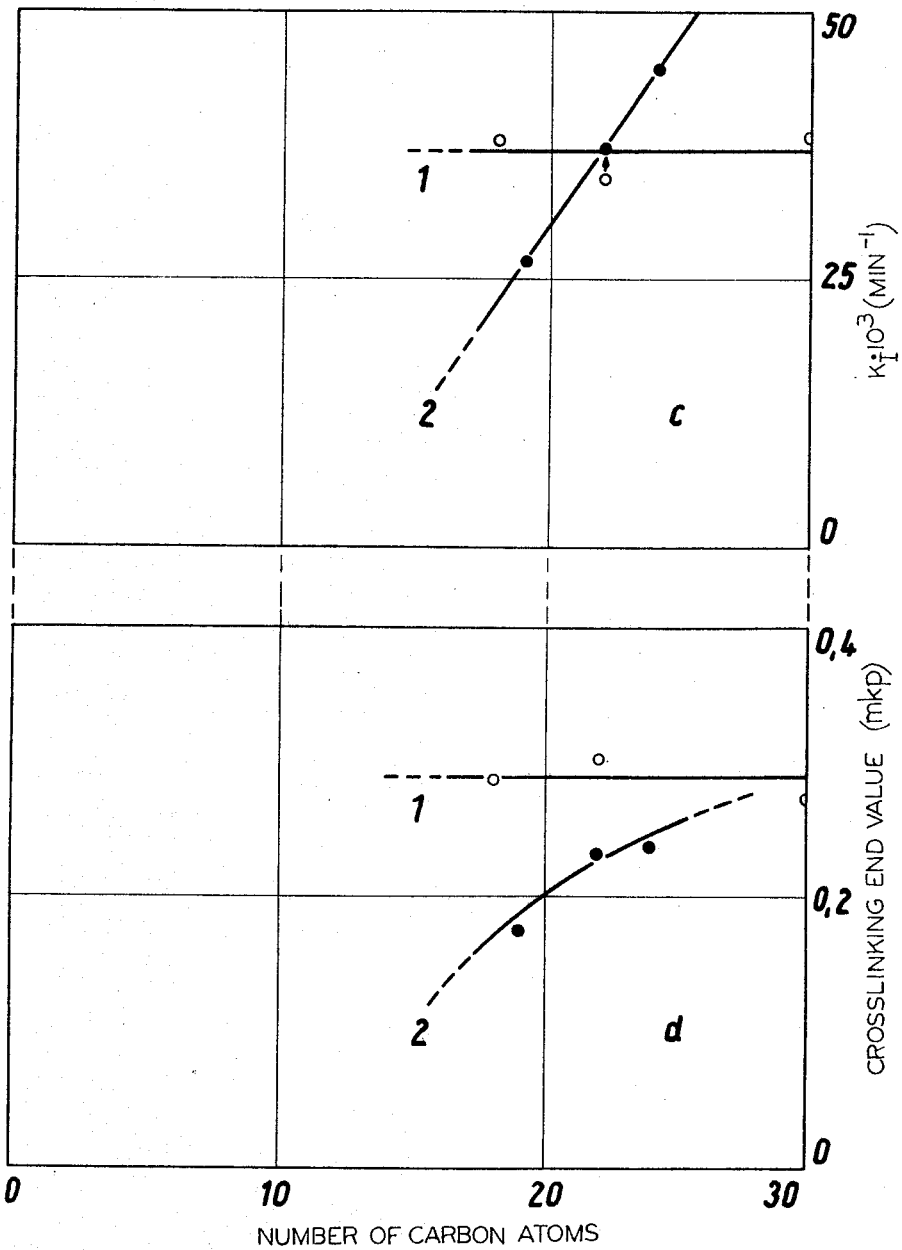

3,514,430
PHOSPHONIUM HALIDES AS VULCANIZATION ACCELERATORS
Walter Scheele, 14 Diedenhofener Str., and Günter Petry, 31 Alte Celler Heerstrasse, both of Hannover, Germany
Filed July 28, 1967, Ser. No. 656,773
Claims priority, application Germany, July 29, 1966, Sch 39,336
Int. Cl. C08f 27/06; C08c 11/54
U.S. Cl. 260—79.5    6 Claims

ABSTRACT OF THE DISCLOSURE

A tetrahydrocarbyl phosphonium salt is employed as vulcanization accelerator for elastomers.

---

Figure 1:
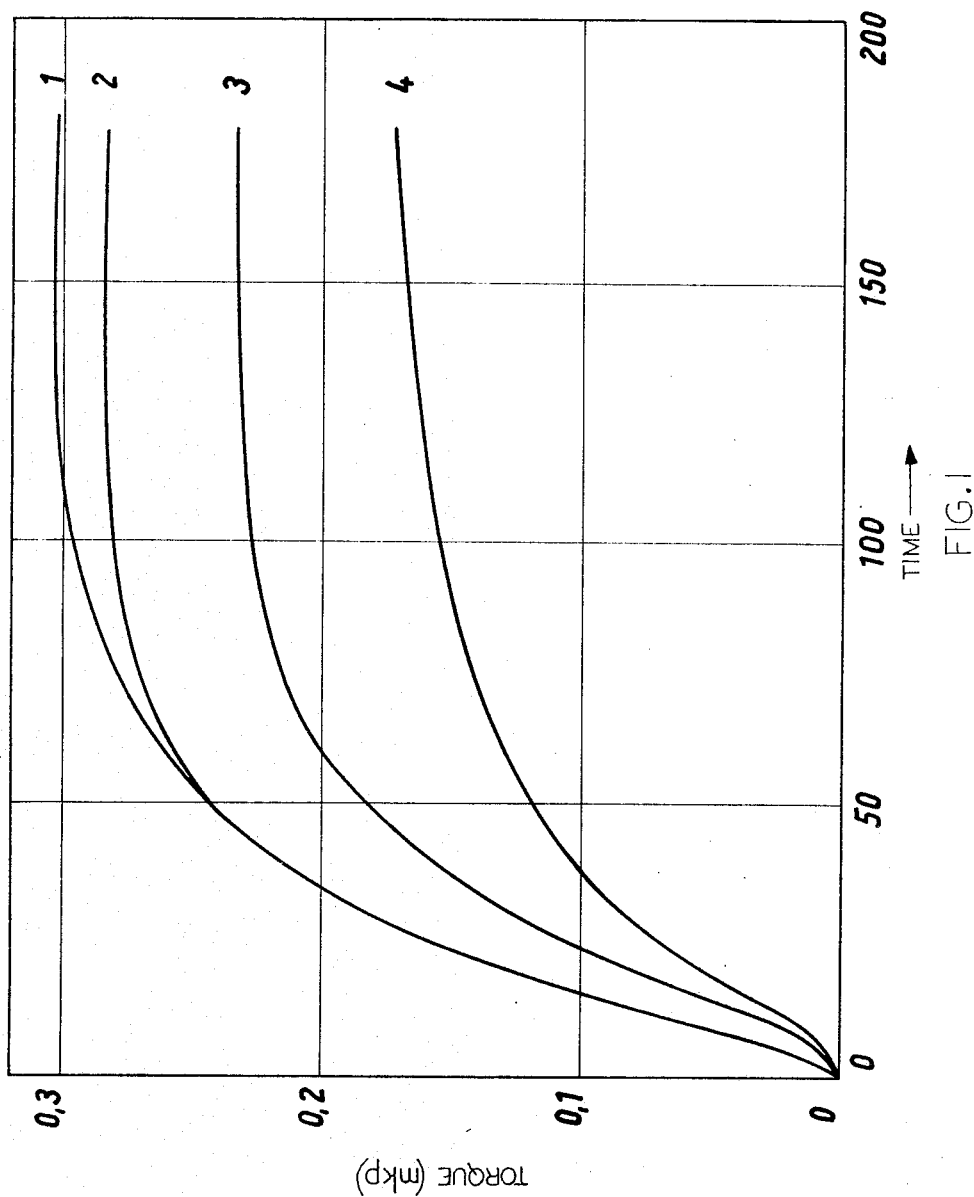

This invention relates to accelerators useful in the vulcanization of elastomeric products.

It is known that mercaptobenzothiazol (MBT) and its zinc salt (ZnMBT) increase the rate of curing of natural or synthetic rubber with sulfur in the presence of zinc oxide; it is also known that said rate of curing is further increased and that the physical and technical properties of the vulcanized rubbers are considerably improved by addition of stearic acid or its zinc salt to the rubber mixture (see O. Lorenz and E. Echte, Kautschuk und Gummi, vol. 10 (1957) WT 23, WT 81, and WT 273; the same authors, Verhandlungsber. Kolloid-Ges., vol. 18 (1958), p. 142; W. Scheele, Rubber Chem. Technol., vol. 32 (1961), 1306; W. Scheele and K.-H. Hillmer, Kautschuk und Gummi Kunststoffe vol. 16 (1963), p. 655).

Recent investigations (see W. Scheele and G. Petry, Kautschuk und Gummi, Kunststoffe vol. 18 (1965), 572) have shown that zinc stearate can be successfully replaced by the zinc salts of other fatty acids and that their action can be explained by the particular capability of soaps to form micellar structures and to solubilize certain otherwise difficultly soluble substances. Due to this capability, zinc salts of fatty acids dissolve the ZnMBT which is practically insoluble in rubber, as micellarly distributed molecular compound; this increases the effective accelerator concentration and results in an increase of the reaction rate. Also the excellent physical and technical properties of the vulcanized articles are probably connected with said solubilization.

As not only anionic soaps, to which the zinc soaps belong but also non-ionic and cationic surfactants form micellar structures, it could be expected that the latter will also influence the ZnMBT accelerated vulcanization.

Further research showed that tetrasubstituted ammonium salts (see W. Scheele and G. Petry, Kautschuk, Gummi Kunststoffe, vol. 19 (1966), p. 14) containing at the nitrogen atom at least one long chain or voluminous alkyl or aralkyl group cannot only completely replace the zinc salts of fatty acids but are themselves excellent accelerators, i.e. they allow of dispensing with the ZnMBT altogether. Suitable such ammonium salts are, e.g., N - hexadecyl - N,N,N-trimethyl ammonium bromide; N-benzyl-N-hexdecyl-N,N-dimethylammonium chloride; N-benzyl-N-diisobutylphenoxyethoxyethyl-N,N-dimethyl ammonium chloride; N,N,N,N-tetrabutylammonium iodide, and others. Such cationic soaps replace, in form of a single compound, two essential auxiliary agents in technical vulcanization processes. Particularly, an increased number of carbon atoms in the total organic groups linked to nitrogen results in a considerable increase of the curing rate and the final cross-linkages, as well as in improved physical and technical properties of the vulcanized products. When said number of carbon atoms exceeds about 16, no further improvement is observed.

It was also found that introduction of one or more aromatic groups at the nitrogen atom of the ammonium salts produced a decrease of the curing rate and of the final cross linkage values. This is shown, e.g., by the N-dodecyl-N,N-dimethyl-N-naphthyl ammonium chloride which has only a small influence on the curing.

In accordance with the invention a vulcanizable elastomeric composition is vulcanized in the presence of a quanternary phosphonium compound of the formula

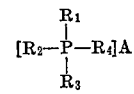

wherein A is the anionic residue of an organic or inorganic acid, e.g., chlorine, bromine, or iodine, and $R_1$, $R_2$, $R_3$ and $R_4$ are hydrocarbyl groups containing 1–18 carbon atoms, e.g., alkyl, aryl, or alkaryl groups. In contrast to the quaternary ammonium compounds where aryl groups interfere with the accelerating effect, we have found that mixed alkyl-aryl phosphonium compounds are particularly efficient, and we prefer to use compounds having one to three alkaryl groups. The curing rate can even be increased when the sum of the carbon atoms in all hydrocarboyl groups exceeds 16, as shown by the P-alkyl-P,P,P-triphenyl phosphonium bromide.

Said quaternary phosphonium compounds are excellent accelerators in the vulcanization of natural and vulcanizable synthetic rubbers which are susceptible of curing when heated with sulfur. Such synthetic rubbers are, e.g., rubbery polymers of butadiene, copolymers of butadiene with styrene and/or acrylonitrile, polychloroprene, and other similar synthetic elastomers. The quaternary phosphonium compounds will generally be employed in amounts of about 0.5 to 5 percent, based on the weight of the rubber. In addition to sulfur, the vulcanizable composition will generally contain other compounding ingredients such as fillers, antioxidants, retarders, softeners, pigment, and the like.

Figure 2A:
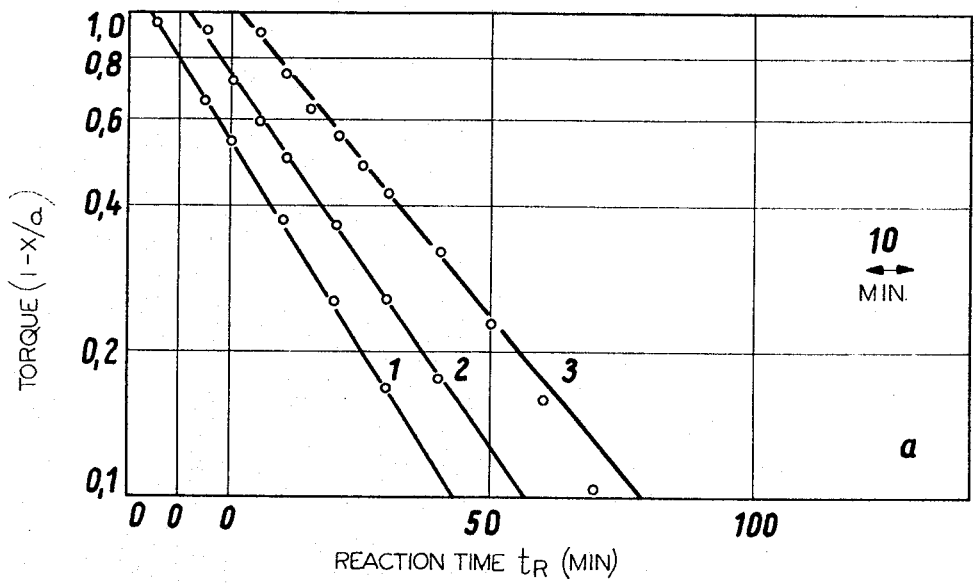

The invention will be described more indetail with respect to the accompanying drawings, wherein FIG. 1 shows the increased degrees of cross-linking of natural rubber mixes by means of phosphonium compounds, plotting the torque ($mkp$) as ordinate against the curing time ($t$);

FIGS. 2a and b show the increased cross-linking effect of various phosphonium compounds as a function of the curing time according to the time law of first order, and FIGS. 2c and d show the rate constants of first order and the end values of cross-linking as function of the number of carbon atoms for different phosphonium salts.

The rubber mix used in all tests was as follows:

Natural rubber (first latex crepe)—100 g.
Sulfur $S_8$—10 millimoles
ZnO—100 millimoles
Phosphonium salt—10 millimoles The curing tests were carried out at a temperature of 130° C., and the increase of cross-linking was determined by measuring the increase of the torque by the oscillation elastometer of the firm Zwick & Co. KG of Einsingen. This apparatus and its operation are described, e.g., in the paper by V. F. Gaddum, Kautschuk und Gummi Kunststoffe, Vol. 19 (1966), pp. 127–132. The kinetic interpretation of cross-linking isotherms has been treated in the following papers: W. Scheele and K.-H. Hillmer, Kautschuk and Gummi Kunststoffe, Vol. 16 (1963), p. 655; Vol. 17 (1964) p. 493 and 629; H. Westlinning, S. Wolff, K.-H. Hillmer and W. Scheele, l.c. Vol. 18 (1965), pp. 24–25; W. Scheele, l.c. pp. 138–145, particularly pp. 139–140).

FIG. 1 shows the influence of the chemical constitution of the phosphonium compounds used as accelerators on the cross-linking rate (slope of the curves) as well as on the cross-linking end values (curves become parallel to the abscissa at longer reaction times).

The curves 1–4 of FIG. 1 give the results of the following quaternary phosphonium salt accelerators:

Curve (1): P,P-dibutyl-P-octyl-P-phenyl phosphonium bromide;
Curve (2): P,P,P-tributyl-P-phenyl phosphonium bromide;
Curve (3): P-butyl-P,P,P-triphenyl phosphonium bromide;
Curve (4): P-methyl-P,P,P-triphenyl phosphonium bromide.

The accelerators of FIG. 1 were the preferred mixed alkyl-aryl substituted quaternary phosphonium salts.

However, quaternary phosphonium compounds may also be used in which all R's are only alkyl or aralkyl or aryl groups. The alkyl groups should always contain 1–18, preferably 4–18 carbon atoms. Suitable alkaryl groups are, e.g. benzyl, β-phenylethyl, 3-phenylpropyl, 4-phenylbutyl, 5-phenylamyl, and others.

Figure 2B:
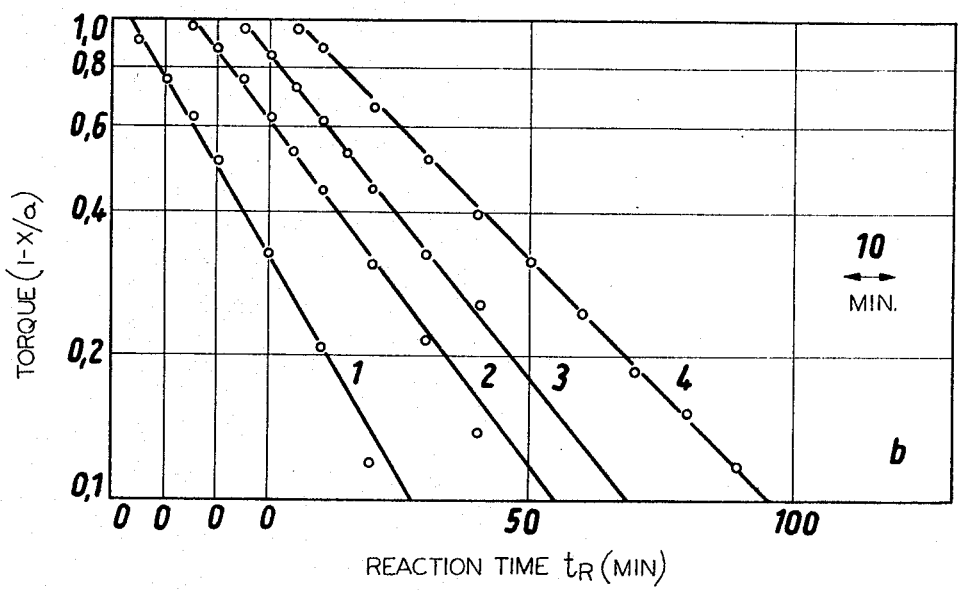

FIGS. 2a and 2b show the cross-linking isothems, calculated from the cross-linking curves recorded by the oscillation elastometer as set forth in the papers referred to above, whereby non-dimensional values of the torques $(l-x/a)$ are logarithmically plotted over the reaction times. From the thus obtained straight lines, the rate constants $k_I$ can be calculated. In the torque formula, $x$ is the difference $(F_t-F_a)$, where $F_t$=value for the rubber mix at a time $t$, and $F_a$ the value for the starting not cross-linked mixture, which difference defines the concentration of the "reaction product" i.e. the cross-linking at the time $t$; $a$ is $(F_\infty-F_a)$=starting concentration of the reactant in the mix.

The cross-linked end values and rate constants $k_I$ calculated from the slopes of the lines in the figures are given in the following tables, which indicate also the quaternary phosphonium compounds used as accelerators.

TABLE I
[Fig. 2a]

| Accelerator | Number of carbon atoms in accelerator | Cross-linked end value (mkp.) | Rate constant $k_I \cdot 10^3$ [min.$^{-1}$] |
|---|---|---|---|
| 1 | 18 | 0.284 | 37.8 |
| 2 | 22 | 0.303 | 34.4 |
| 3 | 30 | 0.274 | 38.5 |

TABLE II
[Fig. 2b]

| Accelerator | Number of carbon atoms in accelerator | Cross-linked end value (mkp.) | Rate constant $k_I \cdot 10^3$ [min.$^{-1}$] |
|---|---|---|---|
| 1 | 19 | 0.174 | 26.4 |
| 2 | 22 | 0.232 | 37.2 |
| 3 | 24 | 0.235 | 44.5 |
| 4 | 24 | 0.238 | 33.2 |

TABLE I (FIG. 2a)

(1)=P,P,P-tributyl-P-phenylphosphonium bromide
(2)=P-octyl-P,P-dibutyl-P-phenylphosphonium bromide
(3)=P-hexadecyl-P,P-dibutyl-P-phenylphosphonium bromide TABLE II (FIG. 2b)

(1)=P-methyl-P,P,P-triphenylphosphonium bromide
(2)=P-butyl-P,P,P-triphenylphosphonium bromide
(3)=P-hexyl-P,P,P-triphenylphosphonium bromide
(4)=P,P,P,P-tetraphenylphosphonium bromide The influence of the number of carbon atoms per molecule of the quaternary phosphonium salt on the rate constants of the first order and on the end values of the cross-linking is illustrated in FIGS. 2c (rate constants) and 2d (cross-linking end values).

In the figures, curve 1 is for P,P,P-trialkyl-P-phenylphosphonium bromides and curve 2 for P-alkyl-P,P,P-triphenylphosphoniumbromides. The latter shows clearly an increased efficiency also for a total number of C atoms which is larger than 16.

In Tables I and II the phosphonium salts are listed according to increasing numbers of carbon atoms. The numbering of the corresponding curves in FIGS. 2a and 2b however is as follows:

Curve:
2a1=P,P,P - tributyl - P - phenylphosphonium bromide
2a2=P - hexadecyl - P,P - dibutyl-P-phenylphosphonium bromide
2a3=P - octyl - P,P - dibutyl-P-phenylphosphonium bromide
2b1=P - hexyl - P,P,P-triphenylphosphonium bromide
2b2=P - butyl - P,P,P-triphenylphosphonium bromide
2b3=P,P,P,P - tetraphenylphosphonium bromide
2b4=P-methyl-P,P,P-triphenylphosphonium bromide

We claim:
1. A vulcanizable elastomeric composition comprising an elastomer and as accelerator a quaternary phosphonium salt of the formula

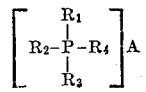

wherein A is an anion selected from the group consisting of chlorine, bromine and iodine and $R_1$, $R_2$, $R_3$ and $R_4$ are hydrocarbon groups.

2. A composition as claimed in claim 1 wherein A is bromine.

3. A composition as claimed in claim 1 wherein at least one of the R groups is an alkyl group having 1 to 18 carbon atoms and at least one other R group is aryl.

4. A composition as claimed in claim 1 wherein at least one of the R groups is an aralkyl group whose alkyl chain has 1 to 5 carbon atoms.

5. A composition as claimed in claim 4 wherein said aralkyl group is a member of the group consisting of benzyl, β-phenylethyl, 3-phenylpropyl, 4-phenylbutyl, and 5-phenyl amyl.

6. A process of accelerating the vulcanization of a vulcanizable elastomeric composition comprising incorporating in said composition, prior to vulcanization, sulfur and a tetrahydrocarbylphosphonium bromide in which at least one of the hydrocarbyl groups is alkyl having 1 to 18 carbon atoms and at least one other hydrocarbyl group is a member of the group consisting of aryl and alkaryl groups.

References Cited

Scheele, W. et al., Kautschuk Gummi, Kungststoffe 19(9), pp. 526–32 (1966) in Chem. Abst., 65, 20331.

JOSEPH L. SCHOFER, Primary Examiner

C. A. HENDERSON, Jr., Assistant Examiner

U.S. Cl. X.R.

260—606.5, 783